Figure 1:
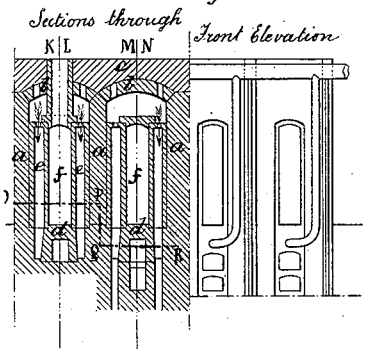

(No Model.)  3 Sheets—Sheet 1.

L. SEMET.
COKE OVEN.

No. 287,332.  Patented Oct. 23, 1883.

Witnesses
R. J. Kirkpatrick
W. F. Kirkpatrick

Inventor
Louis Semet (No Model.) 3 Sheets—Sheet 2.

L. SEMET.
COKE OVEN.

No. 287,332. Patented Oct. 23, 1883.

Sections through AB * CD

Sections through AB * CD

Witnesses
R. S. Kirkpatrick
W. H. Kirkpatrick

Inventor
Louis Semet (No Model.) 3 Sheets—Sheet 3.

L. SEMET.
COKE OVEN.

No. 287,332. Patented Oct. 23, 1883.

Witnesses
R. J. Kirkpatrick
W. J. Kirkpatrick

Inventor
Louis Semet

UNITED STATES PATENT OFFICE.

LOUIS SEMET, OF BRUSSELS, BELGIUM.

COKE-OVEN.

SPECIFICATION forming part of Letters Patent No. 287,332, dated October 23, 1883.

Application filed July 21, 1882. (No model.) Patented in England November 17, 1880, No. 4,733; in Belgium November 17, 1880, No. 53,063, and April 2, 1881, No. 54,279; in France November 17, 1880, No. 139,692, and in Germany May 11, 1881, No. 18,935.

*To all whom it may concern:*

Be it known that I, LOUIS SEMET, a Belgian subject, residing at Brussels, in the Kingdom of Belgium, manufacturer, have invented new and useful Improvements in Coke-Ovens, (for which I have obtained, conjointly with Ernest Solvay, a patent in Great Britain, No. 4,733, bearing date the 17th of November, 1880; in Belgium, No. 53,063, bearing date the 17th of November, 1880, and a patent of improvement No. 54,279, bearing date the 2d of April, 1881; in France, a patent of invention No. 139,692, bearing date the 17th of November, 1880, and a certificate of addition No. 139,692, bearing date the 4th of April, 1881, and in Germany a Patent No. 18,935, bearing date the 11th of May, 1881,) of which the following is a specification, the improvements hereinafter described being exclusively of my own invention.

My invention relates to improvements in that class of kilns or ovens in which the body of the kiln or oven is divided into compartments disposed alternately, the one for the passage of the flames and products of combustion and the others for the reception of the coal to be coked or distilled; and the objects of my improvements are by an improved construction to allow of the thickness of the sides of the walls by which the heat is transmitted to the coal to be considerably reduced, at the same time increasing the amount of heating-surface or surface in contact with the flames, thus obtaining a better utilization of the heat, and consequently effecting the coking or the distillation of the coal in a shorter time; also, to enable each coking-chamber to be heated independently of the others and to facilitate repairs; also, to heat more suitably the air required for combustion, and to provide for the brick-work underneath the soles of the kilns or ovens cooling uniformly.

The improved kilns or ovens consist of a series of massive vertical walls connected together at their upper ends by arches or vaults which support the superstructure of brick-work, and with the walls form a series of coking or distilling chambers. Within these chambers, and on each side of the vertical walls, are placed large hollow bricks of fire-clay, the sides of which bricks are made thin, so as to allow of the heat passing easily through them. The said hollow bricks are placed either vertically side by side or horizontally one above the other, and through the said hollow bricks the gases and products of combustion are caused to circulate. The result of the above-described combination of a massive wall covered on each side with series of hollow fire-clay bricks is a sort of threefold wall extending throughout the entire height of the chamber, wherein the coal to be coked or distilled is to be placed. From suitable furnaces the flames and products of combustion pass under the soles of the chambers, and at the rear end of the said chambers they separate into two currents which pass through the series of hollow bricks, whether disposed horizontally or vertically, the velocity of the said currents being regulated by suitable dampers. If required, a second inlet for gases and air may be arranged by means of branch flues placed underneath the gas-flues, and vertical ducts may be formed in the massive walls, to conduct heated air to the parts where the gases enter. When arranged side by side, the hollow bricks form vertical flues, and when placed one above the other the hollow bricks form horizontal flues, and in both cases they constitute hollow sides of the central massive wall. Longitudinally the walls are consolidated by means of suitable tie-rods, and the bricks are prevented from sliding transversely by the bricks forming the soles and arches of the kilns or ovens. The said bricks may also be connected together by grooves and tongue-pieces throughout their length.

Figure 2:
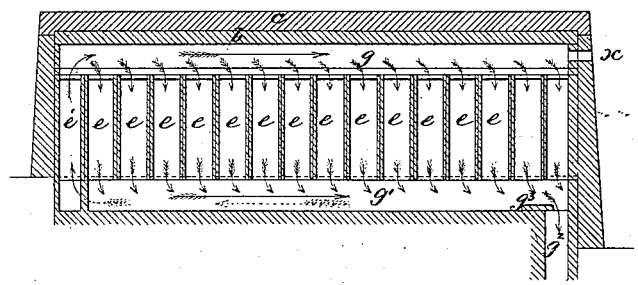
Figure 3:
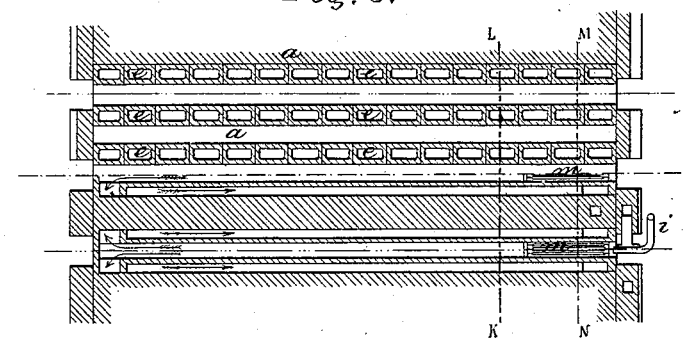

In the accompanying drawings, Figure 1 represents partly a front elevation and partly a transverse section, through the line K L, Fig. 3, of parts of a kiln or oven constructed according to my invention. Fig. 2 is a longitudinal section of the same, and Fig. 3 is a horizontal section of the same through the line O P Q R, Fig. 1.

The walls *a a* are constructed and connected together by the vaults or arches *b b*, which support the superstructure of brick-work *c*. *e e* are hollow bricks placed vertically side by side on each side of the massive walls $a\ a$, and extending from the soles $d$ of the coking or distilling chambers $f$ to the upper flue, $g$. If preferred, the hollow bricks $e\ e$ may be made shorter, and several of the said bricks may be built up, one above the other, so as to form the vertical flues represented.

$m\ m$ are furnaces from which the products of combustion, following the direction of the arrows, (and dotted arrows in Fig. 2,) pass under the soles $d$ to the back end of the chambers $f$, where they divide into two currents, ascending through the end flue, $e'$, to the upper flue, $g$, where they again separate into several currents, descending through the several series of hollow bricks $e$ to the lower horizontal flue, $g'$, from which they pass to the chimney through the flue $g^2$, the opening to which is regulated by a damper, $g^3$. If desired, air and gas may also be caused to enter the flues $g$ through a second inlet at $x$, and in that case branch pipes would conduct the gases thereto from the gas-pipes $i$, and vertical flues may be made in the massive walls $a\ a$, to conduct air heated under the soles to the gas-inlet.

Figure 4:
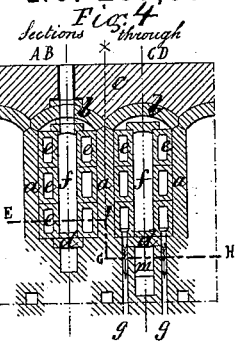
Figure 6:
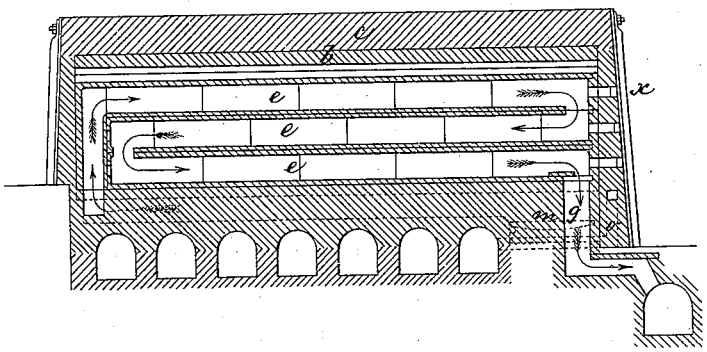
Figure 7:
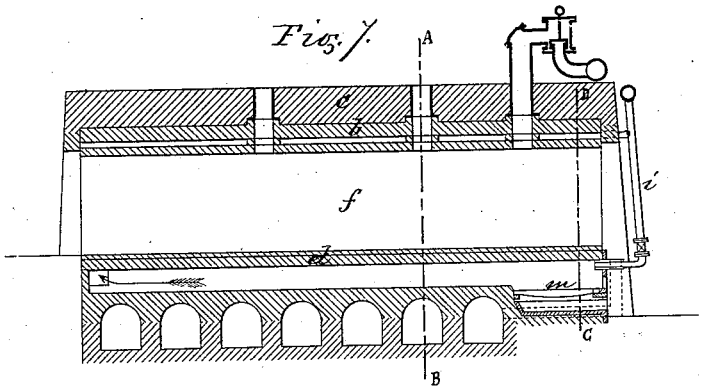
Figure 5:
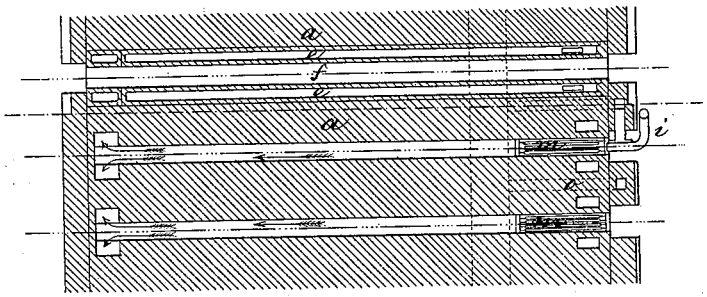

Figs. 4, 5, 6 and 7 represent a kiln or oven, constructed according to my invention, in which the hollow bricks, instead of being placed vertically and side by side, are placed horizontally and one above the other, so as to form horizontal flues for the passage of the flames and products of combustion. Fig. 4 is a transverse section of the kiln or oven, partly through the line A B and partly through the line C D, Fig. 7. Fig. 5 is a horizontal section of the same through the line E F G H, Fig. 4. Fig. 6 is a longitudinal section of the same through the hollow fire-bricks, and Fig. 7 is a longitudinal section of the same through the axis of the coking or distilling chamber.

In the arrangement represented in Figs. 4 5 6 7, $a\ a$ represent the massive walls; $b\ b$, the arches or vaults supporting the superstructure of brick-work $c$. $d$ are the soles of the coal-chambers $f\ f$. $e\ e$ are the hollow fire-bricks, disposed horizontally, one above the other, on each side of the massive wall $a\ a$, and forming flues running backward and forward throughout the length of the chambers $f$, as shown; and $m\ m$ are the fire-places or furnaces. The flames and products of combustion from the said furnace, following the direction of the arrows, pass through the horizontal flues of hollow fire-bricks $e\ e\ e$, and finally escape to the chimney through the passage $g$, the entrance to which is regulated by the dampers $g'\ g'$.

Figure 8:
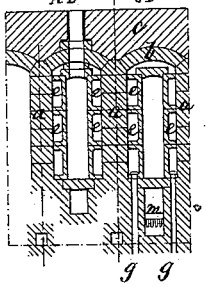

Fig. 8 represents in transverse section a modification of the arrangement represented in Figs. 1, 2, 3, and 4. In this modification, instead of using complete or whole hollow bricks, as represented in Figs. 1, 2, 3, and 4, segments or parts of such hollow bricks $e\ e\ e$ are used, the said segments resting against the massive walls $a$, or embedded in grooves or depressions formed to receive them in the said walls. In this arrangement the sides of the massive walls form the fourth side of the flues.

Figure 9:
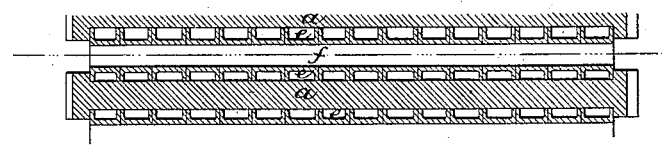

Fig. 9 represents in horizontal section the application of the said segments of hollow bricks $e\ e$ to kilns or ovens with vertical flues, such as are represented in Figs. 1, 2, 3 of the drawings.

Figure 10:
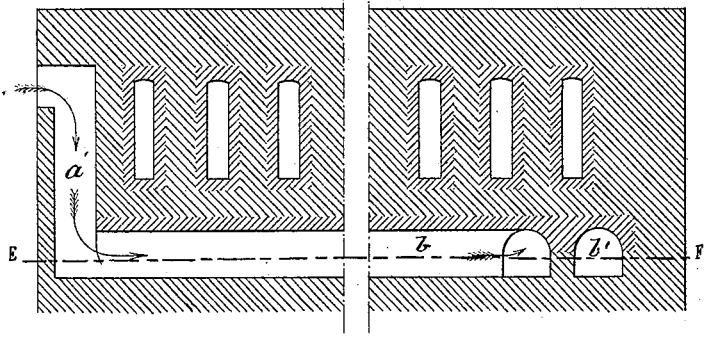
Figure 11:
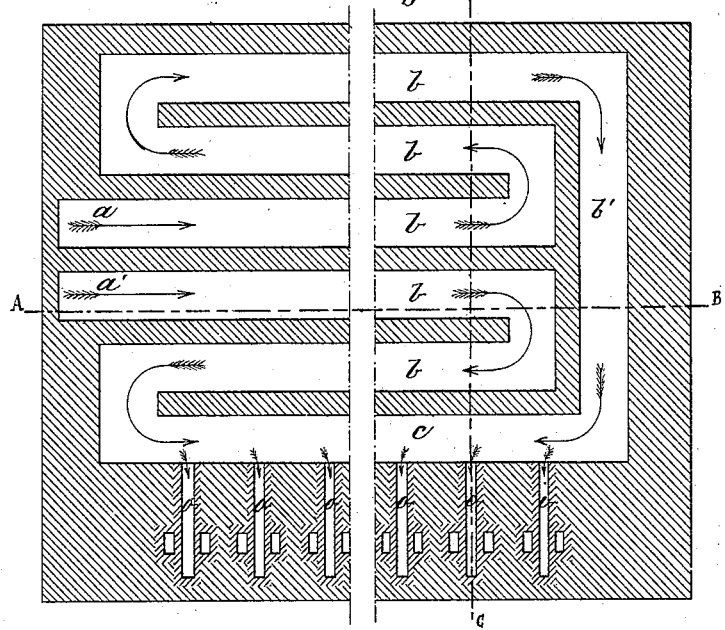
Figure 12:
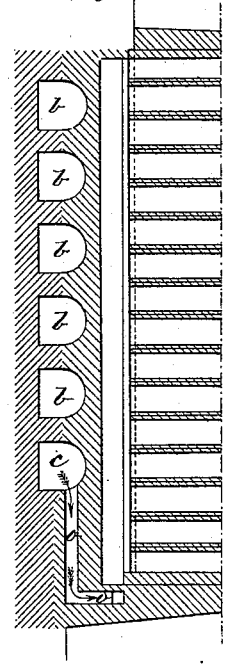

Figs. 10, 11, and 12 represent the construction of the foundations of the improved kilns or ovens, showing the arrangement for heating the air for effecting the combustion of the gases entering the apparatus, and for cooling as regularly and uniformly as possible the brick-work under the soles. Fig. 10 is a transverse section of parts of the said foundations through the line A B, Fig. 11. Fig. 11 is a horizontal section of the same, and Fig. 12 is a longitudinal section of the same through the line C D, Fig. 11. Cold air is introduced into the flues at $a\ a'$ in the middle of the kiln or oven—that is to say, at the hottest part—and circulates through the different zigzag passages $b\ b$, as indicated by the arrows in Fig. 11, approaching gradually the front and back ends of the kiln or oven, which are less heated. The air entering at $a$ advances to the back end of the kiln or oven, and, following the direction of the arrows, passes along the passages $b\ b$ and $b'$ to the gallery $c$, through which it advances toward the front part of the kiln or oven, where it mixes with the air which has entered at $a'$ and followed the direction of the arrows to the said gallery $c$. From thence the heated air passes into the internal flues or passages, $o\ o\ o$, (represented in Figs. 11 and 12,) and from thence to the flues $g$, where it mixes with the gases entering from $i$, to effect their combustion.

What I claim, and desire to secure by Letters Patent of the United States, is—

1. The combination, in an apparatus for coking and distilling coal, of the solid or main walls $a$, supporting the arches and superstructure, with the hollow bricks $e$, forming independent flues for the gases and products of combustion, when arranged substantially as described.

2. The combination of the solid or main walls $a$, supporting the arches and superstructure, with the hollow bricks $e$, forming independent flues communicating with the flues $g\ g'$, substantially as described.

3. The combination of solid or main walls $a$, supporting the arches and superstructure, with the removable hollow bricks $e$, forming independent flues, and the coking-chamber $f$, substantially as described.

4. The combination, in a coking-furnace, of the solid walls $a$, supporting the arches $b$ and the superstructure, with coking-chambers $f$ and the hollow bricks $e$, communicating with horizontal flues $g\ g'$, and forming passages for the gases and products of combustion, substantially as described.

5. The furnace for coking and distilling coal herein described, having solid walls $a$, and provided with chambers $f$ and hollow bricks $e$, disposed alongside the solid walls, and extending from the soles thereof to the upper flue, $g$, and communicating with the lower flue, $g'$, substantially as set forth.

6. A coking-furnace having solid walls $a$, provided with flues $a'\ a'$ and zigzag passages $b$, communicating with passage $b'$, and gallery $c$, in combination with internal flues or passages, $o$, and flues $g$, all arranged substantially as described.

LOUIS SEMET.

Witnesses:
   R. S. KIRKPATRICK,
   H. T. E. KIRKPATRICK,